Sept. 7, 1937.	A. NEVEU	2,092,405
FLUID MOTOR DEVICE
Filed Feb. 2, 1935	3 Sheets-Sheet 1
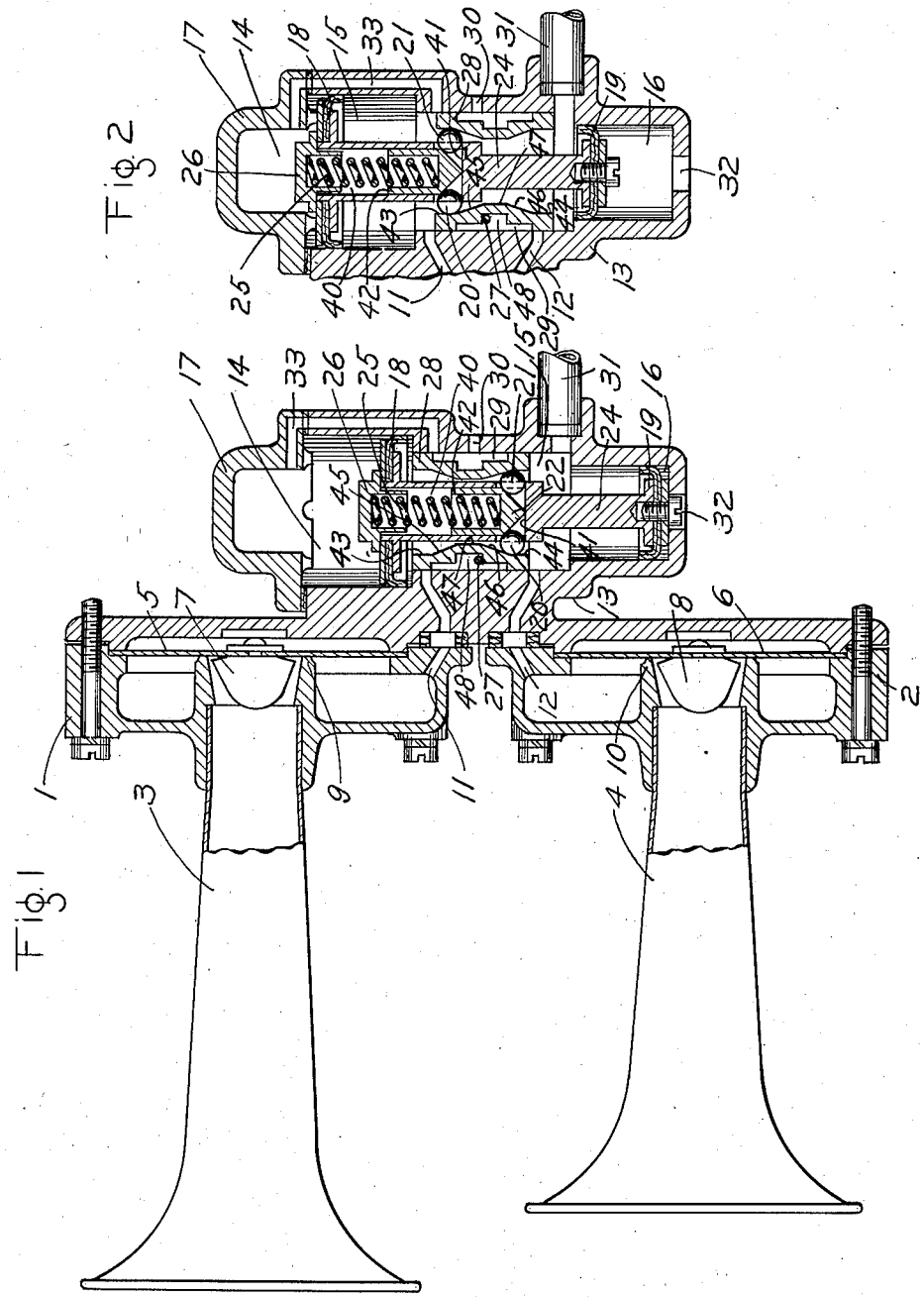
INVENTOR
ANSELME NEVEU
BY *Wm. M. Cady*
ATTORNEY Sept. 7, 1937.  A. NEVEU  2,092,405
FLUID MOTOR DEVICE
Filed Feb. 2, 1935   3 Sheets-Sheet 2
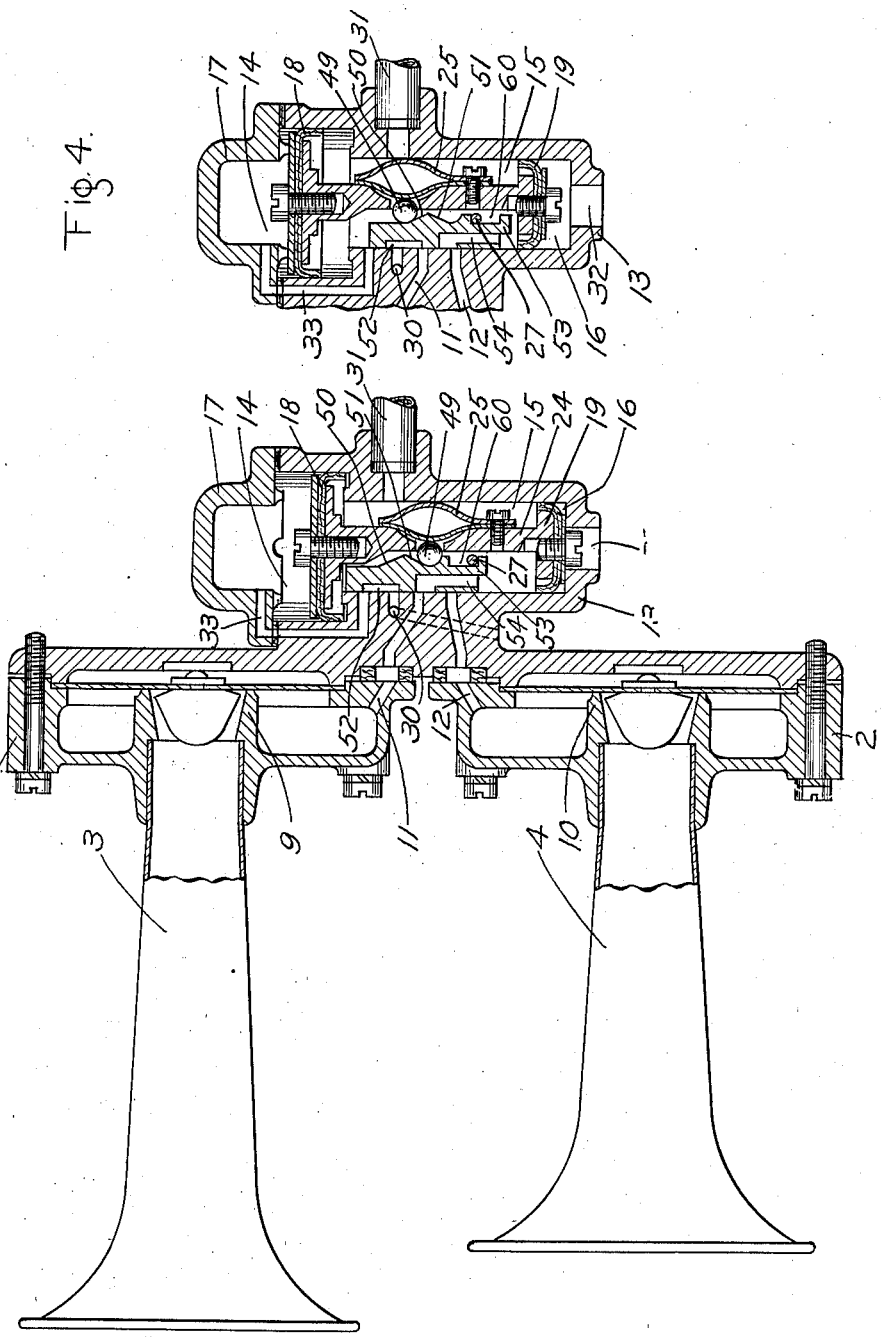
INVENTOR
ANSELME NEVEU
BY
*Wm. M. Cady*
ATTORNEY Sept. 7, 1937.                    A. NEVEU                    2,092,405
                             FLUID MOTOR DEVICE
                             Filed Feb. 2, 1935             3 Sheets-Sheet 3
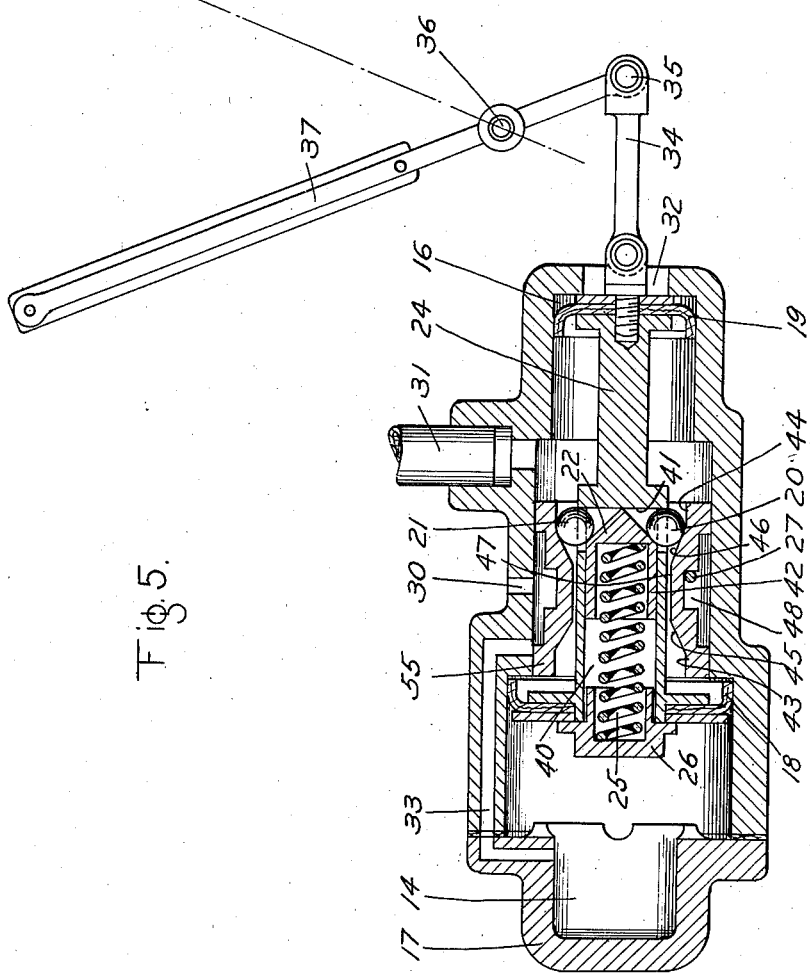
INVENTOR
ANSELME NEVEU
BY Wm. M. Cady
ATTORNEY Patented Sept. 7, 1937

2,092,405

UNITED STATES PATENT OFFICE 2,092,405

FLUID MOTOR DEVICE

Anselme Neveu, Livry-Gargan, France, assignor to The Westinghouse Air Brake Company, Wilmerding, Pa., a corporation of Pennsylvania Application February 2, 1935, Serial No. 4,645
In France May 15, 1934

7 Claims. (Cl. 121—164)

This invention relates to fluid pressure operated reciprocatory motor devices of the kind comprising a movable abutment or system of movable abutments adapted to be reciprocated automatically by fluid supplied from a suitable source under the control of a slide valve which is actuated by the movement of the abutment or system of abutments and controls the pressures acting upon opposite sides of the abutment or upon different abutments of a system.

According to the principal feature of the invention the slide valve is arranged to be moved automatically and relatively rapidly with respect to the abutment or system of abutments during each stroke of the abutment or system so as rapidly to open and close ports which the slide valve controls, and to this end one or more spring-pressed balls or rollers, carried by the abutment stem or any other member carried by the abutment or system of abutments, may be arranged to cooperate with a pair of oppositely arranged sloping or cam surfaces provided on the slide valve so as to move the latter relatively rapidly with respect to the abutment or system when the abutment or system has been displaced a predetermined distance with respect to the slide valve.

A reciprocatory motor device constructed in accordance with the invention as set forth above may be operated either by fluid under pressure or by atmospheric pressure opposed to a partial vacuum and may, for example, be employed as will hereinafter be described to control the alternate actuation of two pneumatic horns which may be of the compressed air or vacuum type, or to actuate a windshield wiper.

In order that the invention may be readily understood, several embodiments thereof will now be described by way of example with reference to the accompanying drawings in which:

Figure 1 is a view, partly in section, of a reciprocatory motor device embodying the invention and associated with two pneumatic horns of the compressed air type and adapted to be reciprocated by means of the compressed air supplied for operating the horns so as to operate the horns alternately and cause a regular succession of different sounds, the reciprocatory motor device being shown in one of its extreme positions.

Figure 2 illustrates the reciprocatory motor device illustrated in Figure 1 in its other extreme position.

Figure 3 is a view similar to Figure 1 illustrating a modified form of reciprocatory motor device associated with two pneumatic horns.

Figure 4 is a view illustrating the reciprocatory motor device illustrated in Figure 3 in its other extreme position.

Figure 5 is a sectional view of a reciprocatory motor device, similar to that shown in Figure 1, as applied to the actuation of a windshield wiper.

As shown in Figure 1 of the drawings, the two pneumatic horns comprise casings 1 and 2 provided respectively with the usual flared elements 3 and 4 respectively and containing diaphragms 5 and 6 carrying masses 7 and 8 respectively, the diaphragms 5 and 6 being arranged to cooperate with seats 9 and 10 respectively.

The horn 1 is arranged to be actuated by fluid under pressure supplied through a passage 11 and the horn 2 by fluid under pressure supplied through a passage 12, the supply of fluid under pressure to said passages 11 and 12 being arranged to be controlled by a distributor 13 to which the horns are secured.

The distributor 13 comprises a casing containing two movable abutments preferably in the form of pistons 18 and 19, the piston 18 having at one side a chamber 14 closed by a cap or cover 17, while the piston 19, which is smaller in area than the abutment 18, has a chamber 16 at the opposite side, a chamber 15 being formed intermediate said pistons and being connected to a fluid pressure supply pipe 31. The pistons 18 and 19 are connected together by a stem 24 which is provided with an axial bore 40 extending part way through said stem, and with two oppositely disposed radial bores opening flush with the bottom wall 41 of the bore 40 and containing two rollers or balls 20 and 21, respectively. A plunger 42 is slidably mounted in the bore 40, and has a wedge or cone-shaped end 22 interposed between the balls 20 and 21. A spring 25 is disposed in the bore 40 between a cap member 26 and the plunger 42 and acts to urge the conical end 22 of said plunger between the balls 20 and 21 and thereby force said balls radially outwardly of the stem 24.

The stem 24 connecting the pistons 18 and 19 freely extends through an axial opening in a cylindrical slide valve 28, which opening is provided at each end with like cylindrical surfaces 43 and 44 which are connected by oppositely disposed and like sloping or cone-shaped surfaces 45 and 46 with a raised central cylindrical surface 47 joining the surfaces 45 and 46, it being noted that the balls 20 and 21 are urged outwardly into engagement with these internal surfaces of said slide valve by the action of spring 25 through the cone-shaped end 22 of the plunger 42 cooperating with the bottom wall 41 of the bore 40.

According as the balls 20 and 21 are applied by the spring 25 and cone-shaped end 22 of the plunger 42 on one or the other of the conical portions 45 and 46 of the slide valve 28 so will the slide valve be moved relatively with respect to the piston stem 24 upwardly or downwardly. A stop pin 27 is secured in the casing so as to be disposed in an annular groove 48 formed in the exterior surface of the slide valve 28 and is adapted to be engaged by opposite sides of said groove in order to limit the movement of the slide valve 28 in opposite directions. The slide valve 28 is provided with an external annular cavity 29 which is adapted to control communication between a passage 33 in the wall of the distributor 13 and an atmospheric port 30, and a further atmospheric port 32 is provided establishing communication between the chamber 16 and the atmosphere.

The operation of the apparatus is as follows:

Assuming that the distributor 13 is in the position in which it is illustrated in Figure 1, when fluid is supplied to the chamber 15 of the distributor through pipe 31 provided for this purpose, the pistons 18 and 19 will be moved upwardly together with the piston stem 24 since the piston 18 is of larger area than the piston 19. During this upward movement of the pistons 18 and 19 and piston stem 24, the slide valve will be prevented from moving upwardly by the stop 27, and since the balls 20 and 21 are carried by the stem 24, the lower coned surface 46 in the slide valve will urge said balls into the bore 40 in the stem 24, thereby moving the plunger 42 upwardly in said bore and compressing spring 25. As soon as the balls 20 and 21 arrive at the upper internally coned surface 45 of the slide valve 28, the outward urging of said balls by spring 25 and coned end 22 of plunger 42 will cause the slide valve 28 to be moved rapidly downwardly to the position in which it is illustrated in Figure 2 as defined by the engagement of the upper side wall of annular groove 48 with pin 27. In this position fluid under pressure is supplied from chamber 15 through the passage 11 to the horn 1 to actuate said horn.

Now in the position illustrated in Figure 2, the slide valve 28 establishes communication between the chambers 14 and 15 above and below the piston 18, thereby equalizing the fluid pressures on said piston with the result that the pressure in chamber 15 acting on the upper side of piston 19 which is subject to atmospheric pressure on the lower side, will now commence to move the pistons 18 and 19 and stem 24 downwardly under the action of the fluid pressure supplied to the chamber 15. During this downward movement of the pistons 18 and 19 and piston stem 24 the slide valve 28 will be retained in its lower position against the stop 27 until the balls 20 and 21 arrive at the lower internally coned surface 46 of the slide valve 28 at which time the outward urging of said balls by spring 25 and the conical end 22 of plunger 42 will cause the slide valve 28 to be moved rapidly upwardly to the position illustrated in Figure 1, as defined by the engagement of the lower side wall of annular groove 48 with pin 27. In this position of slide valve 28, communication is established between the chamber 15 and the horn 2 through the passage 12 through which fluid under pressure is supplied for actuating the horn 2, while the supply of fluid is cut off through the passage 11 to the horn 1. At the same time communication between the chambers 14 and 15 through the passage 33 is cut off and communication between the chamber 14 and the atmosphere through the passage 33, cavity 29 and atmospheric port 30 is established with the result that the pistons 18 and 19 and piston stem 24 are again moved upwardly.

This cycle of operations continues as will be evident so long as fluid is supplied through the pipe 31 to the chamber 15, and the horns 1 and 2 are therefore sounded alternately so as to cause, in regular succession, different sounds.

Referring now to Figures 3 and 4, these figures illustrate a constructional modification of the apparatus fully described with reference to Figures 1 and 2. The apparatus illustrated in Figures 3 and 4 chiefly differs from that illustrated in Figures 1 and 2 in that a slide valve 53 of the type having a flat seating face is provided and a single ball 49, instead of the two balls 20 and 21, is provided, this single ball 49 being disposed adjacent to the upper surface of the slide valve 53, on which are provided two oppositely inclined or sloping cam surfaces 50 and 51, the ball being pressed into engagement with the surface of the slide valve by means of a blade spring 25. The slide valve 53 is provided with a cavity 52 which functions like cavity 29 in the apparatus shown in Figure 1 to connect passage 33 to the atmospheric passage 30 when the slide valve 53 is in its upper position, as shown in Figure 3, while the slide valve 53 uncovers the passage 33 so that fluid under pressure may flow to chamber 14 when the slide valve is in the lower position shown in Figure 4, so that the pistons may operate to position the slide valve 53 in the same manner as the slide valve 28 is positioned in the construction shown in Figure 1. In the construction shown in Figure 3, the slide valve 53 is provided with a port 54 adapted to register with passage 11 in one position of said slide valve and with passage 12 in the other position so as to supply fluid under pressure alternately to the horns 1 and 2. The slide valve is provided with a slot 60 corresponding to the annular groove 48 in the construction shown in Figure 1, and the stop pin 27 which is carried by the casing is disposed in said slot and acts to define the two positions of said slide valve in the manner hereinbefore described in connection with the construction shown in Figures 1 and 2 of the drawings.

The operation of the distributor shown in Figures 3 and 4 is the same as that shown in Figures 1 and 2 except that the leaf spring 25 acts directly on the ball 49 urging said ball against either the inclined surface 50 or 51 to thereby cause the relatively rapid shifting of the slide valve 53 to one or its other positions according to the direction of movement of pistons 18 and 19, in a manner similar to that hereinbefore described in connection with the construction shown in Figure 1.

Referring now to Figure 5, this figure illustrates the application of the reciprocatory device of the invention to a windshield wiper. In this application of the invention a slide valve 55 is provided which is similar to the slide valve 28 shown in Figures 1 and 2 of the drawings but arranged to control only the reciprocation of the pistons 18 and 19 and piston stem 24 which is effected in the same manner as described in connection with the construction shown in Figures 1 and 2 of the drawings. According to this construction, a rod 34 is pivotally connected at one end to the piston stem 24 and at the other end to a windshield wiper operating arm 37 through the medium of a pin 35, the arm 37 being pivotally mounted on a pin 36. By this arrangement reciprocating movement of the piston stem 24 will be transmitted through the rod 34 to the windshield wiper operating arm 37 and thereby cause reciprocation of said arm and thereby the windshield wiper.

It will be evident that the invention is not limited to the particular construction and arrangement of the parts hereinbefore described which may be varied to suit particular requirements without exceeding the scope of the invention and it will also be apparent that the invention is not limited to reciprocatory devices actuated by means of compressed air.

Having now described my invention, what I claim as new and desire to secure by Letters Patent, is:

1. A fluid pressure motor device comprising movable piston means adapted to be moved by variations in fluid pressure, valve means movable to one position for varying the fluid pressure on said piston means to effect movement of said piston means in one direction and movable to another position to vary the fluid pressure on said piston means so as to effect movement of said piston means in the opposite direction, said valve means including two oppositely disposed sloping surfaces, a member associated with said piston means and disposed to alternately engage said surfaces, spring means acting on said member for urging said member into engagement with said surfaces, said spring means being compressible by movement of said member on one of said surfaces upon movement of said piston means in one direction and operative upon engagement of said member with the other of said surfaces for moving said valve means relatively to said piston means to one of said positions for effecting reverse movement of said piston means.

2. A fluid pressure motor device comprising movable piston means adapted to be moved by variations in fluid pressure, valve means movable to one position for varying the fluid pressure on said piston means to effect movement of said piston means in one direction and movable to another position to vary the fluid pressure on said piston means so as to effect movement of said piston means in the opposite direction, said valve means including two oppositely disposed sloping surfaces, and a surface joining the adjacent ends of said sloping surfaces, a member disposed to move on said surfaces and movable with said piston means, a spring for urging said member into engagement with said surfaces, said member, upon movement of said piston means relative to said valve means, being operative by one of said sloping surfaces to compress said spring and operative upon engagement with the other sloping surface to transmit the pressure of said spring thereto to effect movement of said valve means relative to said piston means to one of said positions for effecting reverse movement of said piston means.

3. A fluid pressure motor device comprising movable piston means adapted to be moved by variations in fluid pressure, valve means movable to one position for varying the fluid pressure on said piston means to effect movement of said piston means in one direction and movable to another position to vary the fluid pressure on said piston means so as to effect movement of said piston means in the opposite direction, said valve means being cylindrical in shape and having an axial opening with two oppositely disposed inwardly directed cone-shaped surfaces, a stem carried by said piston means and extending through said axial opening and having a radial opening, a member disposed in said radial opening and adapted to alternately engage said cone-shaped surfaces, spring means carried by said stem for urging said member into engagement with said surfaces, said member, upon movement of said piston means relative to said valve means, being first movable by one of said cone-shaped surfaces into said stem for compressing said spring means and being then operative to transmit the pressure of said spring means to the other cone-shaped surface for effecting movement of said valve means relative to said piston means to one of said positions for effecting reverse movement of said piston means.

4. A fluid pressure motor device comprising movable piston means adapted to be moved by variations in fluid pressure, valve means movable to one position for varying the fluid pressure on said piston means to effect movement of said piston means in one direction and movable to another position to vary the fluid pressure on said piston means so as to effect movement of said piston means in the opposite direction, said valve means being cylindrical in shape and having an axial opening with two oppositely disposed inwardly directed cone-shaped surfaces, a stem carried by said piston means and extending through said axial opening and having oppositely disposed radial openings, a member disposed in each of said radial openings adapted to alternately engage said cone-shaped surfaces, spring means carried by said stem urging said members into engagement with said surfaces, said members, upon movement of said piston means relative to said valve means, being first movable by one of said cone-shaped surfaces into said stem for compressing said spring means and being then operative to transmit the pressure of said spring means to the other cone-shaped surface for effecting movement of said valve means relative to said piston means to one of said positions for effecting reverse movement of said piston means.

5. A fluid pressure motor device comprising movable piston means adapted to be moved by variations in fluid pressure, valve means movable to one position for varying the fluid pressure on said piston means to effect movement of said piston means in one direction and movable to another position to vary the fluid pressure on said piston means so as to effect movement of said piston means in the opposite direction, said valve means being cylindrical in shape and having an axial opening with two oppositely disposed inwardly directed cone-shaped surfaces, a stem carried by said piston means and extending through said axial opening and having oppositely disposed radial openings, a member disposed in each of said radial openings adapted to alternately engage said cone-shaped surfaces, a spring disposed within said stem, a plunger slidably mounted in said stem with one side engaging said spring and the other side engaging said members and being so shaped that the pressure of said spring urges said members outwardly of said stem, said members, upon movement of said piston means relative to said valve means, being first movable by one of said cone-shaped surfaces to compress said spring and then operative to transmit the pressure of said spring to the other cone-shaped surface for effecting movement of said valve means relative to said piston means to one of said positions for effecting reverse movement of said piston means.

6. A fluid pressure actuated reciprocable motor device comprising two movable pistons, one of larger area than the other, a stem operatively connecting said pistons, the outer face of the larger piston being subject to variations in pressure in a control chamber, the outer face of the smaller piston being subject to atmospheric pressure, and the inner face of both of said pistons being subject to the pressure of fluid in an intermediate chamber connected to a source of fluid pressure, a slide valve movable relatively to said pistons and having one position for venting said control chamber to the atmosphere and another position for establishing communication between said control chamber and intermediate chamber, stops for defining said positions, spring means for moving said slide valve relatively to said pistons to said positions, and means operative during a predetermined movement of said pistons relative to said slide valve to impart energy to said spring means for moving said slide valve relatively to said pistons from one position to the other upon further movement of said pistons.

7. A fluid pressure actuated reciprocable motor device comprising two movable pistons, one of larger area than the other, a stem operatively connecting said pistons, the outer face of the larger piston being subject to variations in pressure in a control chamber, the outer face of the smaller piston being subject to atmospheric pressure, and the inner face of both of said pistons being subject to the pressure of fluid in an intermediate chamber connected to a source of fluid pressure, a slide valve movable relatively to said pistons and having one position for venting said control chamber to the atmosphere and another position for establishing communication between said control chamber and intermediate chamber, stops for defining said positions, spring means for moving said slide valve relatively to said pistons to said positions, and means operative during a predetermined movement of said pistons relative to said slide valve to impart energy to said spring means for moving said slide valve relatively to said pistons from one position to the other upon further movement of said pistons, said slide valve being operative upon reciprocation from one of said positions to the other position to alternately open and close a communication between said intermediate chamber and a passage through which fluid under pressure is adapted to be supplied for effecting the operation of a device.

ANSELME NEVEU.

CERTIFICATE OF CORRECTION.

Patent No. 2,092,405.                                September 7, 1937.

ANSELME NEVEU.

It is hereby certified that error appears in the printed specification of the above numbered patent requiring correction as follows: Page 1, second column, line 26, for "abutment" read piston; and that the said Letters Patent should be read with this correction therein that the same may conform to the record of the case in the Patent Office.

Signed and sealed this 16th day of November, A. D. 1937.

Henry Van Arsdale,
(Seal)                              Acting Commissioner of Patents.